United States Patent [19]

Bouchard et al.

[11] Patent Number: 4,497,756

[45] Date of Patent: Feb. 5, 1985

[54] METHOD OF MAKING A PHOTOFLASH ARTICLE USING INJECTION MOLDING

[75] Inventors: Andre C. Bouchard, Peabody; George J. English, Reading; Harold H. Hall, Jr., Marblehead; Thomas J. Sentementes, Wakefield, all of Mass.

[73] Assignee: GTE Products Corporation, Stamford, Conn.

[21] Appl. No.: 308,637

[22] Filed: Oct. 5, 1981

[51] Int. Cl.³ .............................................. B29C 6/00
[52] U.S. Cl. .................................. 264/1.9; 264/138; 264/250; 264/263; 264/272.14; 264/272.15; 264/272.16
[58] Field of Search ............... 264/1.7, 1.9, 272.14, 264/272.15, 272.16, 138, 250, 263

[56] References Cited

U.S. PATENT DOCUMENTS

| | | | |
|---|---|---|---|
| 1,995,863 | 3/1935 | Prideaux | 264/272.16 |
| 2,868,670 | 1/1959 | Laar et al. | 117/94 |
| 2,934,792 | 5/1960 | Harrington | 264/272.16 |
| 3,031,655 | 4/1962 | Temple et al. | 264/272.16 |
| 3,194,953 | 7/1965 | Friedland | 264/272.16 |
| 3,223,273 | 12/1965 | Thorington | 220/2.1 |
| 3,322,992 | 5/1967 | Parker et al. | 264/272.16 |
| 3,506,385 | 4/1970 | Weber et al. | 431/95 |
| 3,612,850 | 10/1971 | Nijland et al. | 240/1.3 |
| 3,893,797 | 7/1975 | Hough et al. | 431/94 |
| 4,045,867 | 9/1977 | Strom | 264/272.14 |
| 4,169,281 | 9/1979 | Brower et al. | 362/13 |
| 4,197,333 | 4/1980 | Leach et al. | 427/54.1 |
| 4,282,559 | 8/1981 | Audesse et al. | 362/15 |

FOREIGN PATENT DOCUMENTS

| | | | |
|---|---|---|---|
| 811981 | 4/1959 | United Kingdom | 264/272.14 |
| 1111927 | 5/1968 | United Kingdom | . |
| 1141527 | 1/1969 | United Kingdom | . |
| 2039936 | 8/1980 | United Kingdom | . |

*Primary Examiner*—James Lowe
*Attorney, Agent, or Firm*—Lawrence R. Fraley

[57] ABSTRACT

A method of making a photoflash article including a substrate member, a plurality (e.g., ten) of electrically-activated photoflash lamps, and a light-transmitting polymer covering which encapsulates each of the photoflash lamps and is also secured to the substrate member to define a unitary component. The substrate is produced by injection molding with each of the lamps subsequently positioned therein. This assembled component is then either placed within an injection mold apparatus and a predetermined quantity of thermoplastic or thermosetting resin injected therein to define the polymer member, or the polymer is added in liquid form to completely fill each of the substrate member's individual lamp-receiving compartments. The finished article is especially suited for forming part of a completed photoflash device further including circuitry and other items, such as described in the present art.

7 Claims, 10 Drawing Figures

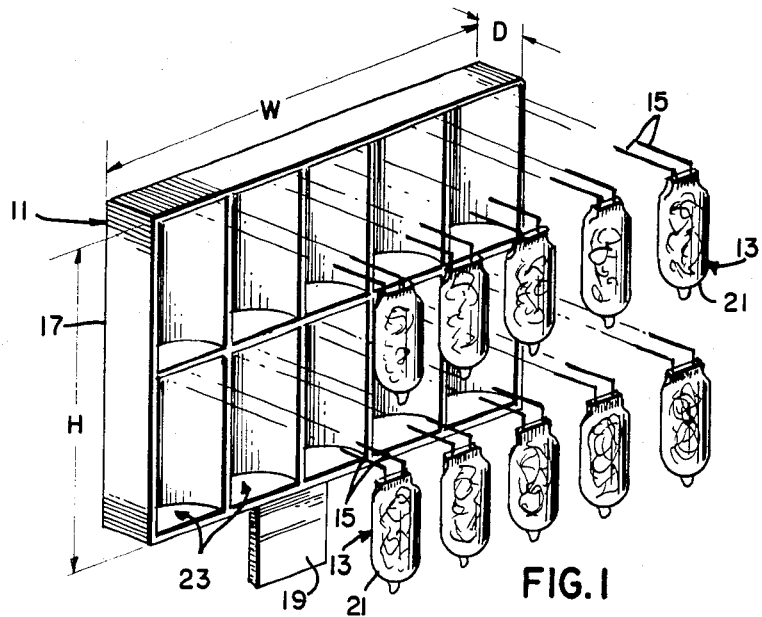
FIG. 1
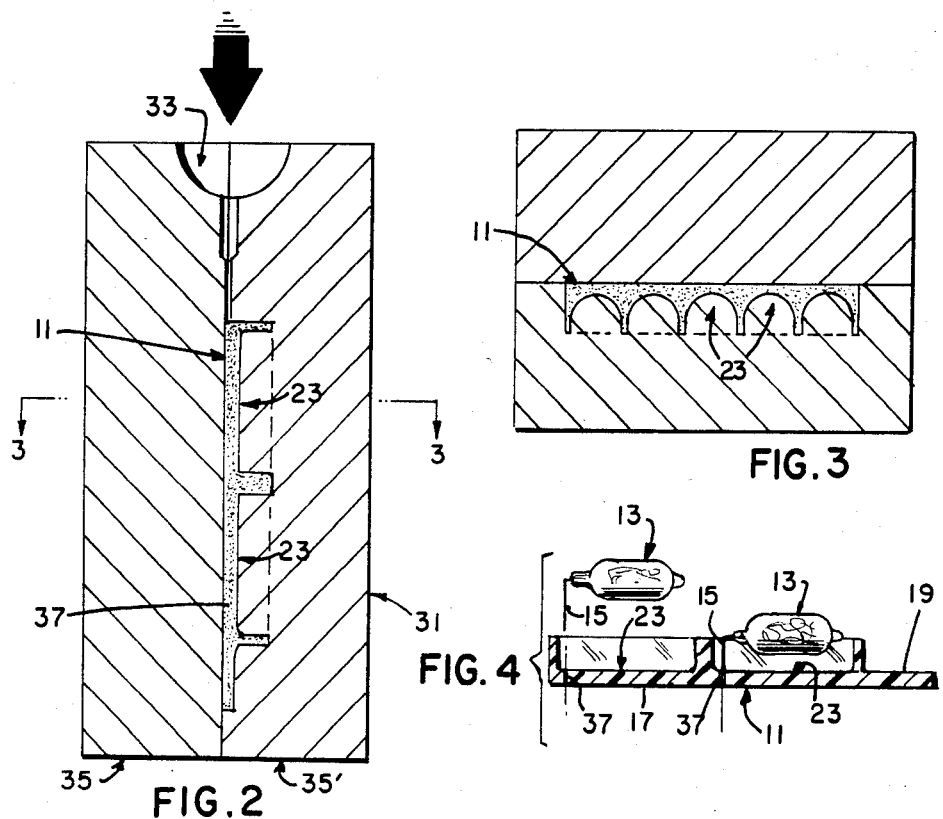
FIG. 2
FIG. 3
FIG. 4

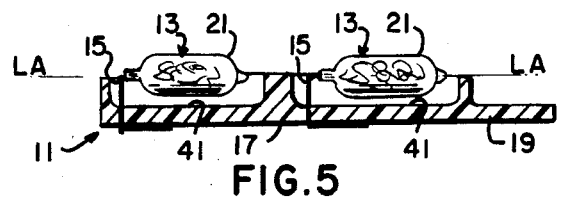
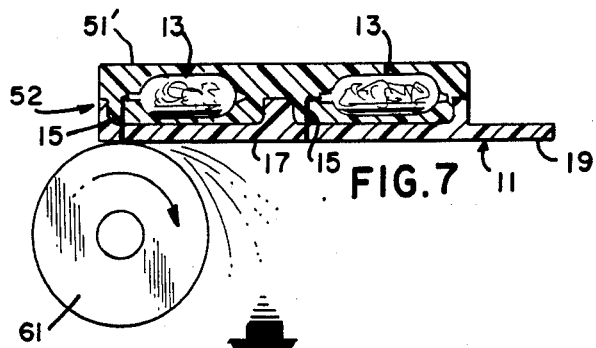
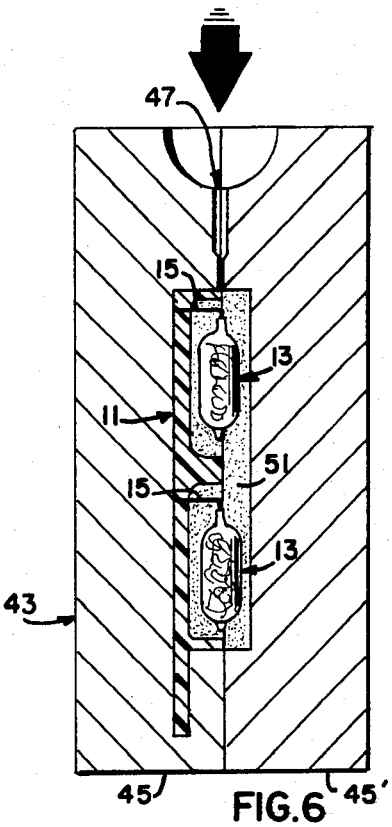
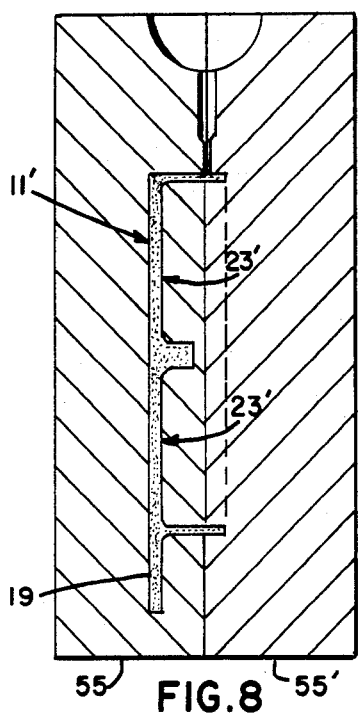
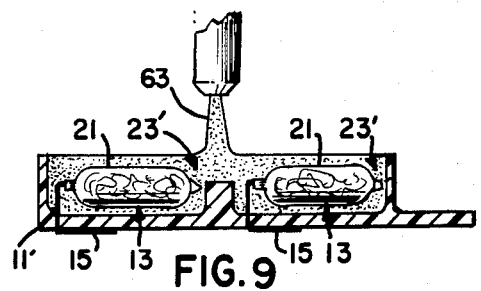
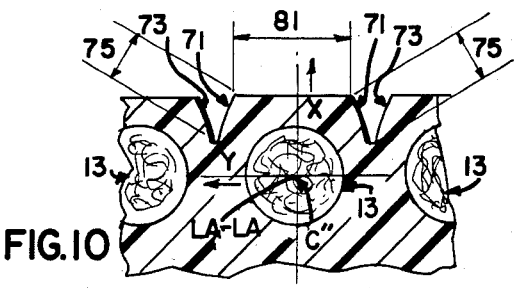

METHOD OF MAKING A PHOTOFLASH ARTICLE USING INJECTION MOLDING

TECHNICAL FIELD

The invention relates to methods of positively containing lamps with a protective material, and more particularly, to containing lamps of the photoflash variety.

BACKGROUND

A typical photoflash lamp comprises an hermetically sealed glass envelope, a quantity of combustible material located in the envelope, such as shredded zirconium or hafnium foil, and a combustion-supporting gas, such as oxygen, at a pressure well above one atmosphere (e.g. 8-12 atmospheres). The lamp also includes an electrically or percussively activated primer for igniting the combustible to flash the lamp. During lamp flashing, the glass envelope is subjected to severe thermal shock due to hot globules of metal oxide impinging on the walls of the lamp. As a result, cracks and crazes occur in the glass and, at higher internal pressures, containment becomes impossible. Understandably, it is essential to contain the glass envelope in order to protect the consumer who uses the typical photoflash device having at least one and usually several (e.g., 4, 6, 8 or 10) such lamps located therein.

Heretofore, there have been several diverse techniques employed to provide coatings on lamps of the type defined. One approach has been to reinforce the glass envelope by applying a protective coating of cellulose acetate lacquer on the lamp envelope by means of a dip process. In the typical dip process, a large number of envelopes are loaded onto a rack and then sequentially dipped in the cellulose acetate lacquer and oven-dried a sufficient number of times to build up the desired coating thickness. The process is time-consuming, generally requires a large area of production floor space and involves considerable hand labor, all of which add significantly to manufacturing costs. The solvent, generally comprising acetone, is highly flammable and introduces a high risk of fire by ignition of vapors in either the dip bath or drying oven. Injuries to personnel is thus possible, as is the possibility of equipment failure. In addition, consumption of fire extinguishing chemicals resulting from solvent fires further adds to the manufacturing costs.

Another technique utilized in the industry has been to employ a special hardglass material for the envelope, in addition to a protective dip coating. An example of such a glass material is described in U.S. Pat. No. 3,506,385 (K.H. Weber et al). This material, borosilicate, typically consists essentially of the following constituents: 60 to 75 percent by weight $SiO_2$, 10 to 25 percent by weight $B_2O_3$, 1 to 10 percent by weight $Al_2O_3$, 4 to 10 percent total alkali oxides (e.g, Na, K, and Li oxides), and 0 to 5 percent by weight BaO. Although providing some degree of improvement in the containment capability of lamp envelopes, the use of dip coatings and hardglass also present signifiant disadvantages in the area of manufacturing cost and safety. More specifically, the hardglass incurs considerable added expense over the more commonly used softglass due to both increased material cost and the need for special lead-in wires (e.g., iron-nickel-cobalt alloy) to provide sealing compatibility with the hardglass material. In addition, even though more resistant to thermal shock, hardglass envelopes can also exhibit cracks and crazes upon lamp flashing, and thus do not obviate the need for a protective coating.

A further procedure has involved the application of photopolymer coatings to the lamp envelope and thereafter curing these coatings by irradiation with a source of ultraviolet (UV) light. In one example, the lamp is held vertically with the base up and dipped into a vat of the photopolymer at 60° C. and extracted very slowly, the dip process taking about 45 seconds. The resulting coating thickness is about 0.020 inch. According to an alternative approach of the method, the flashlamp, while revolving, is sprayed with the liquid photopolymer and then transferred directly into the ultraviolet lamp chamber. Added reinforcement is possible by the use of glass fibers which, for example, may be wrapped about the envelope prior to dipping in the liquid photopolymer, or by premixing short fibers in the photopolymer and applying the coating having said fibers therein. A somewhat critical aspect of the aforementioned UV cured coating is that the shape and uniformity of thickness depends on the flow characteristics of the photopolymer resin as influenced by the force of gravity, orientation of the lamp after coating, and viscosity of the resin. Changes in resin viscosity resulting from changes in temperature affect both the repeatability of the shape of the coating and the uniformity of thickness. These irregularities are retained once the coating is hardened. To overcome this, it has been necessary to design complex manufacturing equipment and to completely re-orient (to a horizontal position) the lamp envelopes during coating. An example of this more recent method, as well as apparatus for applying such a coating, is described in U.S. Pat. No. 4,197,333 (B.H. Leach et al).

Still another approach to providing an improved containing vessel is described in U.S. Pat. No. 3,893,797, (H.L. Hough et al) wherein a thermoplastic coating, such as polycarbonate, is vacuum formed onto the exterior surface of the glass envelope. The method of applying the coating comprises: placing the glass envelope within a preformed sleeve of the thermoplastic material; drawing a vacuum in the space between the thermoplastic sleeve and the glass envelope; and, simultaneously heating the assembly incrementally along its length, whereby the temperature and vacuum cause the thermoplastic to be incrementally formed onto the glass envelope with the interface substantially free of voids, inclusions and the like. This method provides an optically clear protective coating by means of a significantly faster, safer, and more economical manufacturing process, which may be easily integrated on automated production machinery.

Yet another, substantially earlier, approach to protective coatings for lamps is disclosed in U.S. Pat. No. 3,223,273 (L. Thorington), wherein the exterior surface of the glass envelope of an incandescent lamp is coated with an adhesive resin such as a phenyl or methyl polysiloxane, and then wrapped with a layer of fiber glass yarn having an index of refraction about the same as that of the resin. Prior to wrapping, the yarn is treated with a wetting agent in solvent solution form. Upon completing the dipping and wrapping processes, the covered lamp is placed in a baking oven to cure the resin. The lamp may then be redipped in resin and again cured. Although providing a relatively strong lamp coating, this approach is characterized by many of the same manufacturing disadvantages of the aforementioned solvent dipping process.

In U.S. Pat. No. 3,612,850 (L.M. Nijland et al), there is described a procedure for surrounding portions of individual lamp envelopes in a multilamp device for purposes of hopefully preventing possible lamp explosion. As shown therein, an acrylate resin (e.g., a methyl methacrylate monomer polymerized by the addition of benzoyl peroxide) is located along and substantially about the longitudinal side walls of each envelope after the structure, including all four lamps and corresponding individual reflectors, is arranged in a mold. There are several disadvantages with this technique. Firstly, it fails to assure total lamp containment in view of the apparent necessity for exposing large areas of each lamp's upper and lower regions. Accordingly, it is essential in U.S. Pat. No. 3,612,850 to provide additional safety means such as the illustrated base and outer cover components. It is also apparent from this patent that the apparatus utilized to provide the desired partial containment must be relatively complex in order to assure aligned orientation of the several reflectors and lamps while locating the acrylate resin in place. In view of this requirement, the method does not readily lend itself to mass production at relatively low costs, nor can the method be easily adapted to processing of photoflash devices of different configurations, e.g., the more recently introduced, substantially planar 8 and 10 lamp electrically-activated devices such as described and illustrated in U.S. Pat. Nos. 4,169,281 (B. G. Brower et al) and 4,282,559 (E. G. Audesse et al).

DISCLOSURE OF THE INVENTION

It is a primary object of the present invention to provide a new and unique method of making a photoflash article having at least one photoflash lamp as part thereof wherein the lamp is encapsulated in a protective, polymer covering.

It is a further object of the invention to provide such a method which overcomes the several mentioned disadvantages associated with the lamp coating techniques described above. Specifically, the invention is readily adaptable to mass production, is relatively inexpensive to utilize, and is capable of producing a finished photoflash article having several (e.g. 10) individual lamps strategically arranged therein, each being totally encapsulated to maximize protection during flashing. The method utilizes a minimal amount of encapsulant per device, thus further reducing the cost of the end product. It is also readily capable of containment of lamps within a variety of different configurations, although it will be understood from the following that the preferred lamp orientation is planar with a series of lamps (e.g., 5) in each of two parallel rows. In its broadest aspect, the invention is of course capable of providing positive containment of but a single photoflash lamp.

In accordance with one aspect of the invention, there is described a method of making a photoflash article which includes a substrate member and at least one photoflash lamp. The method comprises the steps of injection molding an insulative substrate member which defines at least one open-sided compartment therein, orienting at least one photoflash lamp having a glass envelope within the compartment, positioning the insulative substrate and photoflash lamp within an injection mold apparatus, injecting a quantity of a thermoplastic or thermosetting resin capable of forming a light-transmitting polymer member upon solidification thereof within the mold apparatus to surround the glass envelope of the photoflash lamp and contact the insulative substrate member, solidifying the resin material to form the polymer, said resin bonding also to the substrate member and therafter removing the article from the mold apparatus.

In accordance with another aspect of the invention, there is defined a method of making a photoflash article including a substrate member and photoflash lamp, the method comprising the steps of injection molding an insulative substrate member defining at least one open-sided compartment, orienting at least one photoflash lamp within the compartment, pouring a liquid casting resin material capable of forming a light-transmitting solid polymer upon curing thereof within the compartment of the substrate member to a preestablished depth such that the material flows about and surrounds the external surface of the glass envelope of the photoflash lamp, curing the material to form said solid, light-transmitting polymer, said polymer also bonded to said substrate to thereby define the photoflash article.

BRIEF DESCRIPTION OF THE DRAWINGS

FIG. 1 illustrates a multi-compartment substrate member produced in accordance with the teachings of the invention, said member to form part of a photoflash article also produced in accordance with the teachings of the invention. The individual photoflash lamps which form part of the photoflash article are also shown;

FIGS. 2-6 illustrate the steps of forming a photoflash article in accordance with one embodiment of the teachings of the invention;

FIG. 7 illustrates an optional operation which may be performed on a photoflash article produced in accordance with the teachings of the invention;

FIGS. 8 and 9 illustrate a method of making a photoflash article in accordance with an alternative embodiment of the invention; and FIG. 10 illustrates a lens component formed within the polymer member produced by the teachings of the invention in accordance with one embodiment thereof.

BEST MODE FOR CARRYING OUT THE INVENTION

For a better understanding of the present invention, together with other and further objects, advantages, and capabilities thereof, reference is made to the following disclosure and appended claims in connection with the above-described drawings.

With particular reference to FIG. 1, there is illustrated a multi-compartmented, insulative substrate member 11 which is produced in accordance with the teachings of the invention. Substrate 11, as stated, is of an insulative material, preferably a thermoplastic. One example of such a material is polystyrene. Substrate 11, as will be defined below, is produced by an injection molding technique in accordance with the teachings of the invention and is to eventually form part of a photoflash article also produced by the teachings herein. Said article will also include at least one electrically-activated photoflash lamp 13 (a total of 10 are illustrated in FIG. 1), and a light-transmitting polymer member or component (described below) which serves to totally encapsulate each of the photoflash lamps 13 and to bond to substrate 11 so as to form a robust, unitary article. The resulting article (see, e.g., FIG. 7) is readily capable of withstanding shock or similar harsh treatment without harm to the several photoflash lamps contained therein. This article is thus ready for further manufacturing in order to produce a finished photoflash device (not shown) such as those illustrated in corresponding applications under Ser. No. 183,915 and Ser. No. 262,008. Ser. No. 183,915 is entitled "Miniature Photoflash Unit With Encapsulated Flash Lamps" (Inventors: A.C. Bouchard et al), and was filed Sept. 2, 1980. Ser. No. 262,008 is entitled "Miniature Photoflash Unit Using Subminiature Flashlamps" (Inventors: A.C. Bouchard et al), and was filed May 8, 1981. As described in each of these applications, the lead-in wires (15 in FIG. 1) in the completed photoflash device are electrically connected to a corresponding circuit path located on a planar substrate member. With regard to the teachings herein, this circuit path can be located on the back or reverse side 17 of substrate 11 and thereafter covered or similarly protected by suitable means (as described in the corresponding copendng applications). It is also possible to locate the circuit path on a separate cover or substrate member and attach it to the substrate 11 such that the circuit path is electrically secured to the respective lead-in wires 15, said procedure also fully disclosed in the corresponding applications.

The completed photoflash device is readily capable of use with many of today's cameras which typically utilize disposable, multilamp photoflash devices well-known in the art. This product as described herein, however, represents a substantially smaller version of such devices, as well as one which can be manufactured at less expense. As an example of the relatively small size of the eventual device, substrate 11, in accordance with the teachings of one embodiment of the invention, possessed a thickness (dimension "D" in FIG. 1) of only about 0.16 inch, a width (dimension "W" in FIG. 1) of only about 1.00 inch, and a height (dimension "H" in FIG. 1) of only about 1.25 inch. To form part of the connector tab which is adapted for being inserted within the aforedescribed camera sockets, substrate 11 further includes a projecting tab element 19 which extends downwardly only about 0.250 inch from the main body portion.

Each of the photoflash lamps 13 which comprise part of the photoflash article produced in accordance with the teachings herein are preferably of the electrically activated variety and thus include a glass envelope 21 and a pair of lead-in wires 15 projecting therefrom. Located within envelope 21 is a pressurized (e.g., 8-12 atmospheres) combustion-supporting gas such as oxygen and a quantity of shredded, filamentary combustible material such as zirconium or hafnium. The lamps utilized herein are defined as being those of the subminiature variety and possess a glass envelope 21 having an external diameter of only approximately 0.165 inch and a length of slightly less than 0.500 inch. Each of the lead-in wires is of a metallic material, several examples of which are known in the art and additional description is not deemed necessary. Envelopes 21, as stated, are of glass and may be of any glass material recognized in the photoflash art, typical examples including softglass (e.g., soda lime, lead), as well as the more recently introduced hardglasses (e.g., borosilicate). Although the lamps 13 are described as being electrically activated, it is also within the scope of the invention to utilize lamps of the percussively actuated variety as are well known in the art. Such lamps typically include a metallic primer member of tubular configuration which projects from one end of the lamp's glass envelope and includes therein a primer material. Deformation of the tubular member results in deflagration of the primer material therein upwardly into the glass envelope to ignite the shredded combustible located therein and produce the desired high intensity flash. Electrically activated lamps are preferably used in the invention, however, to accommodate the greater number of cameras capable of utilizing electrical photoflash devices.

In FIG. 1, substrate 11 is shown as including a total of ten individual compartments 23, each adapted for having one of the photoflash lamps 13 positioned therein. Each compartment includes an open end portion (facing the viewer in FIG. 1). Lamps 13 as positioned in substrate 11 (and in the finished article) are arranged in a substantially planar array consisting of two parallel, linear rows each containing a total of five lamps therein. In the finished photoflash device, these lamps are electrically connected in a series relationship such that those in the first (lower) row are sequentially ignited (or fired) first, afterwhich those in the upper row are individually flashed in a sequential manner. The camera user is thus provided with a singular, extremely small device capable of producing a total of ten high intensity flashes. Although it will be described and shown to produce a photoflash article containing several individual photoflash lamps, it is of course within the broad aspects of the instant invention to produce a substrate member wherein only one photoflash lamp is utilized.

As is well acknowledged in the photoflash art, ignition of photoflash lamps results in subjecting the glass envelope to severe thermal shock as a result of hot globules of metallic oxide therein striking the internal walls of the envelope. Cracks and crazes readily occur in the glass and at the described high internal pressures, the lamp is capable of exploding. Accordingly, it is essential that said lamps be provided with a protective covering or coating about the glass envelope sufficient to prevent shattering thereof and escapement of any glass particles or similar elements which could harm the user of the device. As will be described below, the photoflash article produced in accordance with the teachings of the instant invention is capable of providing a protective covering about each of the individual photoflash lamps 13 utilized herein in a new and unique manner. The completed device, of which the article produced herein forms part of, is thus safe to operate and can be produced at relatively low cost utilzing mass production techniques.

In FIG. 2, there is illustrated a two part injection molding apparatus 31 adapted for forming insulative substrate 11. Apparatus 31 is preferably comprised of aluminum and includes an intake orifice 33 to which is connected a nozzle component (not shown) through which the polystyrene melt is passed. The two parts of the aluminum apparatus 31, illustrated by the numerals 35 and 35' serve to define the multicompartment configuration for substrate 11, with a sectional plan view thereof being illustrated in FIG. 3 (as taken along the line 3—3 in FIG. 2). Each of the individual compartments 23 within the upper row of substrate 11 can be seen in cross section in FIG. 3. In FIG. 2, the polystyrene melt 37 has been injected at a temperature of between about 200 to 300 degrees Farenheit and a pressure of from about 3,000 to about 5,000 pounds per square inch. In one specific example, a nozzle temperature of 440 degrees Farenheit and a barrel temperature of 430 degrees Farenheit was used. The corresponding mold temperature (of both parts 35 and 35') was about 250 degrees Farenheit. A ram pressure of 4,000 pounds per square inch was employed. Solidification of the melt 37 occured in approximately 5 seconds, afterwhich the solidified substrate 11 was removed. In a preferred embodiment of the invention, the polystyrene preferably contains a colorant (e.g., titanium, dioxide), which resulted in a finished product white in color. This is desired in the inventon in order to enhance reflecting of the high intensity light from each of the flashlamps 13 located therein outwardly through the light-transmitting cover portion of the completed article. That is, the white substrate serves as a reflector for each of the lamps oriented therein.

The individual compartments formed within substrate 11 serve a twofold purpose, namely: (1) each act as lamp constraining and aligning elements during the subsequent encapsulation operation (described below); and (2) each act as light shielding components to prevent neighboring lamps in the completed array from sympathetically igniting unfired lamps. Sympathetic ignition of photoflash lamps is a recognized phenomona in the art and occurs when lamps are too closely positioned.

To accommodate each of the two lead-in wires 15 for each lamp 13, holes 37 are provided (e.g., drilled) within the back or base portion of the now solidified substrate 11. Each hole 37 is designed to accomodate the linear segment of each lead-in wire in the pre-bent lamp configuration depicted in FIG. 4. Preferably, the holes 37 provided within substrate 37 are of a diameter only slightly larger than that of the external diameter for each lead-in wire. In one example, holes 37 had an internal diameter of 0.020 inch, while that of the corresponding lead-in wire inserted therein possessed an external diameter of about 0.014 inch. To further facilitate positioning of each lamp, the lead-in wires 15 are preferably bent back against the rear, external surface 17 of the solidified substrate. This bending is illustrated in FIG. 5 and serves to assure that the glass envelopes 21 are retained in the substantially horizontal and coaxial relationship shown. The longitudinal axis of each lamp is illustrated in FIG. 5 by the line LA—LA. It is important to note that in FIG. 5 each of the lamps 13 is spacedly positioned from the bottom or back wall 41 of each compartment 23. In other words, the glass envelope does not contact or otherwise engage any of the interior surfaces of each compartment 23 in which it is positioned. In one example, a spacing of about 0.10 inch was used. The reason for maintaining each evelope 21 at said spacing is to assure that the resin material to be added to substrate 11 (see below) is able to smoothly flow about and totally surround each envelope.

In addition to holes 37, it is also possible to provide an aperture (not shown) within the back wall of each compartment to enable the radiant energy in the form of light and/or heat from the lamp located therein to pass through the aperture and activate a radiation switch located relative (behind) to the aperture and forming part of the circuitry in the completed product, should such switches be utilized. An example of such a radiation switch is described in U.S. Pat. No. 4,169,281 (B.G. Brower et al), said components typically comprised of silver oxide dispersed in a polyvinyl resin or of any similarly functioning material having an initial high resistance or open circuit and thereafter possessing a near zero resistance upon receipt of the lamp's radiant energy. Each switch is located in contact with and bridges corresponding, preselected circuit runs in the product's circuitry to assure the desired sequential activation of unfired lamps.

With each of the lamps 13 in position within substrate 11, this assembled component is in turn located within a two-part mold apparatus 43 (FIG. 6). Each of these parts (illustrated by the numerals 45 and 45′) is also preferably of aluminum and when mated together as shown in FIG. 6, serve to define the final exterior configuration for the front portion of the photoflash article to be produced in accordance with the teachings herein. Specifically, part 45′ serves to define the outer, more substantially planar face portion of the finished article. With the apparatus assembled, as shown in FIG. 6, a predetermined quantity of a thermoplastic or thermosetting resin 51 is injected through an orifice 47 defined by the mated components. The preferred resin is a thermoplastic resin and preferably a clear, modified polystyrene resin. A preferred example is available from the Phillips Chemical Company, Bartlesville, Okla., and sold under the product name K-BDS Polymer. Understandably, this material is capable of forming a light-transmitting polymer member upon solidification thereof within mold 43 such that it serves to totally encapsulate each of the photoflash lamps 13 with a protective coating. Resin 51 is also capable of engaging the polystyrene substrate component 11 and bonding thereto such that upon solidification of the polymer, a unitary, completed structure results. This article, illustrated in FIG. 7, is then removed from mold apparatus 43 and subjected to additonal manufacturing steps in order to produce the photoflash device described in the aforementioned, copending applications.

Resin 51 is injected at a temperature within the range of about 200 to about 300 degrees Farenheit and at a pressure of from about 2,000 to about 8,000 pounds per square inch. In a specific example, a nozzle temperature of 250 degrees Farenheit and a ram pressure of 4,000 pounds per square inch was used. A corresponding mold temperature (of parts 45 and 45′) of 250 degrees Farenheit was used. The entire molding cycle took approximately only 10 seconds to complete, and, surprisingly, no damage to any of the glass envelopes was incurred during this relatively high pressure operation.

In FIG. 7, there is illustrated an optional step which can be performed on the article as produced by the teachings herein. This article, illustrated by the numeral 52, includes the polystyrene substrate 11, a plurality of the described electrically-activated photoflash lamps 13, and the solidified polymer 51′ bonded to substrate 11 and encapsulating each of the lamps 13. In FIG. 7, this optional step includes the removal of all portions of the lead-in wires 15 which project externally from the back surface 17 of substrate 11. This step is preferred when subjecting the article 52 to the subsequent operations defined in the copending applications. However, it is within the scope of the invention to electrically connect the wires 15 by other means. In the simplest form, it is possible to join the lamps 13 in the desired series relationship using standard electrical wiring and suitable switching components of a variety known in the art. The resulting circuit path can in turn be connected to a tab or smilar projection which is insertable within the socket typically provided in each of the aforedescribed cameras, or the circuitry can be formed on the projecting tab which forms an integral portion of substrate 11. Removal of each of the projecting portions of lead-in wires 15 is accomplished by a suitable grinding implement 61 (FIG. 7) until each was flush with the external surface 17.

With regard to FIGS. 8 or 9, there is shown a method of making a photoflash article in accordance with an alternate embodiment of the invention. In FIG. 8, a white polystyene substrate 11' is produced using a two-part injection molding apparatus in much the same manner as substrate 11 in FIG. 2. This two part, aluminum molding apparatus is represented by the numerals 55 and 55' and is substantially similar to apparatus 31 (FIG. 2) with the exception that it defines a substrate 11' having substantially deeper compartments 23' therein. More specifically, each compartment 23' has higher (or deeper) sidewall portions for purposes defined below. The remaining parts of the substrate (e.g., tabular segment 19) are substantially similar to those of substrate 11. The same molding temperatures and pressures as used in the formation of substrate 11 above were used during this step. The solidified substrate 11' was thereafter removed from the mold apparatus and the desired number of photoflash lamps 13 were positioned therein in much the same manner as the mode of insertion described in FIG. 4. With each of the lamps 13 firmly secured in position, a quantity of a liquid casting resin material 63 having a waterlike viscosity was poured within the individual compartments 23' defined by the extending sidewalls and bottom wall of substrate 11'. Approximately 0.10 ounce of liquid resin was poured. The preferred material 63 is a polyester resin having a curing agent, said material available from the Buehler Corporation, Evanston, Illi., and sold under the product name Castolite. It is understood, however, that Castolite represents only one example of a material which may be used in this embodiment of the invention. Other materials which can be satisfactorily used in the instant invention include epoxy casting resins such as Stycast 1269-A, sold by Emerson and Cuming, Inc., Canton, Mass., and "2-Ton" clear epoxy, sold by the Devcon Corporation, Danvers, Mass. Both of these materials exhibit excellent high temperature properties and color durability, in addition to being crystal clear upon curing.

Yet another resin material suitable for use in the instant invention is an acrylate resin; that is, a resin which is provided by the polymerization of acrylic acid, methacrylic acid, or the esters of these (e.g., ethyl, butyl, and methyl esters). Polymerization may be accomplished by exposing the poured material (monomer) to ultraviolet light, or heat, or by the addition of an organic peroxide. For example, it is possible to fill the mold member to a first level (nearly to the top surface) with methyl methacrylate monomer having a minor percentage by weight benzoyl peroxide (e.g., 0.01 to 0.10 percent), and therafter adding about 0.05 percent by weight benzoyl peroxide. Polymerizing of the monomer occurs in about 20 minutes at room temperature (about 70 degrees F). Mechanical properties can be enhanced; that is, a plasticizer (e.g., dibutyl phythalate) can be added to the monomer before completion of the polymerizing phase.

The polyester resin 63 was poured as shown in FIG. 9 to a depth within substrate 11' such that it filled the entirety of each of the individual compartments 23'. Accordingly, resin 63 surrounded the entire external surface of each glass envelope 21, said envelopes being oriented in the planar, spaced orientation shown in FIG. 9. The minimum thickness for the polymer coating as produced in accordance with the teachings hereof was approximately 0.10 inch.

After resin 63 has been poured within substrate 11', it is allowed to cure until it hardens to a solid mass. Curing is achieved in one aspect of the invention by exposing substrate 11' having the resin therein to a temperature within the range of about 60 to 80 degrees Farenheit for a period of between 6 and 8 hours. In one specific example, the resin was cured at a temperature of 70 degrees Farenheit for approximately 8 hours. The result was a solid, light-transmitting polymer which served the aforedescribed dual purpose of both totally encapsulating each of the individual photoflash lamps 13 and also bonding to the polystyrene substrate 11' to provide a unitary structure.

It is understood with regard to the present invention that curing of resin 63 could be accomplished on a more accelerated fashion than that described. That is, it is possible to expose the substrate and resin to higher temperatures for lesser periods of time. For example, subjecting substrate 11' and resin 63 to a temperature within the range of about 120 degrees Farenheit to about 130 degrees Farenheit allowed the resin to cure within a time period of only about 30 minutes.

With particular regard to FIG. 10, there is illustrated a lens component 71 which can be formed within the polymer covering as formed using the dual injection-molding operation described above. Specifically, the part (No. 45' in FIG. 6) of the mold apparatus which serves to define the outer, forward front polymer configuration includes a plurality of projecting surfaces (not shown) which serve to define a corresponding number of indentations 73 within the formed polymer adjacent each of the respective photoflash lamps 13 encapsulated therein. More specifically, each formed lens component is shown (FIG. 10) as including first and second substantially opposed curved surfaces 75 which are of parabolic configuration and extend the full length (into the drawing in FIG. 10) of each glass envelope. The resulting cylindrical, parabolic curved surface 75 is preferably formed in accordance with the formula $X = 12.93\ Y^2 - 0.41\ Y + 0.27$, wherein X represents the distance from the center of each lamp 13 (wherein the lamp's longitudinal axis LA—LA passes) toward the front or facing portion of the formed article, and Y represents the distance along the plane in which is located each of the several lamps 13, said plane parallel to the front, flat surface (81) of the polymer material. Each of the parabolic surfaces 75 are interconnected by flat forward surface 81, this surface having a width of approximately 0.115 inch. The formed lens component for each lamp serves to direct the high intensity light emitted from each lamp so as to properly illuminate the desired subject located an established distance from the camera in which the finished product is utilized. The cylindrical, parabolic surfaces 75 serve to redirect some of the rays from each lamp in a direction substantially perpendicular to the planar array itself whereas the flat surface 81 provides a spreading of light rays over the desired subject. It is also within the scope of the invention to substitute a convex cylindrical surface for that of the flat surface 81 in FIG. 10. The convex surface would have its center in the corresponding center of the respective lamp 13 (illustrated by the letter "C" in FIG. 10).

There has thus been shown and described a new and unique procedure for producing a photoflash article of unitary construction wherein each of the several photoflash lamps positioned therein are provided with a protective covering so as to prevent escapement of any glass particles therefrom during lamp ignition. The resulting article constitutes a solidified, robust light-transmitting component having a solidified substrate member securely joined to a polymer member with the desired quantity of photoflash lamps oriented strategically therein. By the term light-transmitting is meant that the finished, solidified article is capable of transmitting the high intensity light emitted from each photoflash lamp upon ignition thereof without adversely affecting the lamp's output. As stated in one example, the polymer material in the finished product was clear (transparent) even at the thicknesses described above.

The invention as described is readily adaptable to mass production and utilizes a minimal material, thus reducing cost of the finished product. It has also proven to provide a stronger, more effective means of containment than the several, aforedescribed techniques. For example, a total of about eighty photoflash articles were individually tested (the several lamps fired) with the result being no fractures or similar containment problems. The transparent component also assured at least the same index of refraction as was attainable using the separate, thinner cover member as typically utilized in multilamp photoflash devices currently available on the market. As described, the thickness of the encapsulated polymer material was much greater than that of the aforedescribed thermoplastic coatings to thus assure additional reinforcement and protection in the finished product. Hermeticity is also improved over the described techniques in that the entire external surface of each glass envelope, as well as portions of the lead-in wires projecting therefrom, are completely encased within the solidified material. In effect, said material represents a second seal for the glass envelope at the press-sealed end thereof to provide additional means of preventing leakage therefrom. The finished product thus has a longer shelf life than earlier multilamp products. With regard to the embodiment of the invention as depicted in FIGS. 8 and 9, it is also within the scope of the invention to provide additional reinforcement of the polymer component through the use of glass fibers, said fibers preferably added to the liquid resin prior to pouring within the mold cavity. It is even further within the scope of the invention to add color-correcting blue dyes or similar material to the polymer during formation thereof in the event that modification of output color is desired.

While there have been shown and described what are at present considered the preferred embodiments of the invention, it will be obvious to those skilled in the art that various changes and modifications in addition to those described may be made therein without departing from the scope of the invention as defined by the appended claims.

We claim:

1. A method of making a photoflash article including a substrate member and a plurality of electrically-activated photoflash lamps each including a glass envelope and a pair of lead-in wires projecting therefrom, said method comprising:

injection molding an insulative substrate member defining a plurality of open-sided compartments therein;

providing a pair of openings within said substrate adjacent each of said open-sided compartments;

inserting each of said pairs of lead-in wires within a respective pair of said openings within said substrate to orient each of said photoflash lamps within a respective one of said compartments such that the glass envelope of each of said lamps is spacedly positioned from the walls of said substrate, said lead-in wires being inserted through the open end of each of said respective compartments and passing through said openings and thereafter being bent back against an exterior surface of said substrate;

positioning said insulative member having said photoflash lamps oriented therein within an injection mold apparatus;

injecting a predetermined quantity of a thermoplastic or thermosetting resin capable of forming a light-transmitting polymer member upon solidification thereof within said mold apparatus to occupy each of said compartments and totally surround the glass envelopes of each of said photoflash lamps, said thermoplastic or thermosetting resin being injected at a temperature within the range of about 200 to about 300 degrees Farenheit and at a pressure of from about 2000 to about 8000 pounds per square inch, said lead-in wires bent against said substrate assisting in retaining said glass envelopes in said spaced positioning relationship during said injecting of said resin;

solidfying said quantity of resin to form said light-transmitting polymer about each of said glass envelopes, said resin bonding to said substrate member to define said photoflash article; and removing said article from said mold apparatus.

2. The method according to claim 1 wherein said insulative substrate member is injection molded from a thermoplastic resin and said resin injected within said mold apparatus is a thermoplastic resin, said resin of said substrate having a colorant added thereto and capable of reflecting light emitted by said photoflash lamps through said polymer.

3. The method according to claim 2 wherein said thermoplastic resin forming said substrate member is injected at a temperature within the range of about 400 to about 480 degrees Farenheit and at a pressure within the range of about 3000 to about 5000 pounds per square inch.

4. The method according to claim 3 wherein said thermoplastic resin of said substrate member and said thermoplastic resin forming said light-transmitting polymer is polystyrene.

5. The method according to claim 1 further including removing all portions of said lead-in wires extending from said substrate member subsequent to said removal of said article from said mold apparatus.

6. The method according to claim 1 wherein the number of lamps located within said light-transmitting polymer of said article is ten, said lamps each oriented within a respective compartment within said substrate in a substantially planar array prior to said injecting of said resin.

7. The method according to claim 1 including forming a lens component within said polymer adjacent each of said photoflash lamps, said lens component including first and second substantially opposed curved surfaces for directing the light emitted by said photoflash lamp and passing through said polymer.

* * * * *